United States Patent [19]

Kishida et al.

[11] Patent Number: 4,526,904

[45] Date of Patent: Jul. 2, 1985

[54] METHOD OF REGENERATING CATION EXCHANGE MEMBRANE BY TREATMENT WITH STRONG ACID AT ABOVE 110° C.

[75] Inventors: Konosuke Kishida; Masaru Hirokawa, both of Kitaibaraki, Japan

[73] Assignee: Kabushiki Kaisha Musashino Kagaku Kenkyusho, Tokyo, Japan

[21] Appl. No.: 514,022

[22] Filed: Jul. 15, 1983

[30] Foreign Application Priority Data

Jul. 23, 1982 [JP] Japan ................................ 57-127729

[51] Int. Cl.$^3$ ............................................. C08D 5/20
[52] U.S. Cl. ..................................................... 521/26
[58] Field of Search ......................................... 521/26

[56] References Cited

U.S. PATENT DOCUMENTS 4,174,426 11/1979 Asami .................................... 521/30
4,423,157 12/1983 Masuda .................................. 521/27

Primary Examiner—Paul R. Michl
Assistant Examiner—Peter F. Kulkosky
Attorney, Agent, or Firm—Wenderoth, Lind & Ponack

[57] ABSTRACT

A method for regenerating a perfluorinated cation exchange polymer membrane which can give only a low current efficiency as a result of being used as a diaphragm in an electrolytic cell or an electrodialyzer, said method comprising maintaining said perfluorinated cation exchange polymer membrane at a temperature of at least 110° C. while keeping it in contact with an aqueous solution of a strong acid having a pH at ordinary temperature of not more than 1.0.

7 Claims, No Drawings

METHOD OF REGENERATING CATION EXCHANGE MEMBRANE BY TREATMENT WITH STRONG ACID AT ABOVE 110° C.

This invention relates to a method for regenerating a perfluorinated polymer cation exchange polymer membrane whose performance has been reduced through use.

An ion exchange membrane process has gained commercial acceptance in the production of an alkali by electrolysis of a salt. In this process, a cation exchange membrane is used to separate a catholyte containing an alkali from a solution of a starting salt. Ion exchange membranes adapted for this purpose are required to have high chemical stability because they are used under severe conditions. Preferably, there are exclusively used ion exchange membranes prepared by attaching ion exchange groups to the side chains of a fluorinated polymer. These membranes are generally called perfluorinated cation exchange membranes (to be abbreviated as perfluorinated membranes), and are commercially available under tradenames Nafion, Flemion, Neosepta F, etc.

Perfluorinated membranes are prepared by molding a copolymer of a fluorinated olefin and a fluorinated vinyl monomer having a side chain, either alone or together with various reinforcing materials, into a membranous shape, and as required, subjecting the membrane to various chemical reactions to introduce ion exchange groups. Commercially available perfluorinated membranes have such ion exchange groups as sulfonic acid groups, sulfonamide groups, and carboxyl groups on all or a part of the side chains. Membranes of various types can be produced according to use conditions because their performances differ with the types of the monomers used and the types and distributions of the ion exchange groups introduced.

Many perfluorinated membranes have the common defect that when they are used over long periods of time, impurities present in the electrolyte contaminate them to reduce their performances, resulting in an increased electrical resistance or a reduced current efficiency. The reduction of the current efficiency greatly increases power consumption by electrolysis and constitutes the most serious problem in the ion exchange membrane process. This reduction in performance is also observed in membranes of the above type which have been used in electrodialyzers. It has previously been thought that the performances of membranes whose current efficiency has been reduced cannot be completely restored, and they should be replaced by new ones, when their performance has been reduced to some extent. Since the perfluorinated membranes are expensive, the cost of replacement in the overall cost of electrolysis can by no means be ignored. The cost of replacement could be saved by retarding the reduction of the performance of membranes, but this entails the disadvantage that the starting salt should be purified to an extreme extent.

It is an object of this invention to provide a method for regenerating a membrane having reduced performance to a state which permits its further use.

The reduction of the performance of a membrane is due mainly to the fact that ions of metals such as calcium, magnesium or manganese contained in the electrolyte combine with ion exchange groups, or form insoluble salts such as sulfates or carbonates to deposit them on the surface or inside of the membrane. In particular, the deposits accumulated in the inside of the membrane are considered to reduce the current efficiency irreversibly because even when they are not of such a size as to destroy the membrane macroscopically, they expand the texture of the membrane to increase its water content and thereby to permit easy permeation of hydroxyl ions. Since these deposits are composed of such substances as are found in scales which generally cause troubles in cooling water pipes, boilers, etc., it is a very commonplace idea to attempt at reviving the performance of the membrane by dissolving and removing these deposits with a washing liquor containing an acid or a chelating agent. In fact, this method of washing is successful in many cases in boilers, etc. However, when a perfluorinated membrane having its performance reduced is immersed in an aqueous solution of an acid or a chelating agent at ordinary temperatures, its current efficiency is not at all regained, or is regained only to a small extent. This treatment never gives the same performance as a fresh membrane. Even when the performance is regained to some extent, the current efficiency, in many cases, is again decreased within short periods of operation time. The performance of the membrane cannot be regained completely despite the fact that substances which contaminate the membrane are, by nature, soluble in such washing liquors. The present inventors made investigations in order to find out a reason for it and have arrived at the present invention.

The essence of this invention consists in bringing a membrane having its performance reduced through use into contact with an aqueous solution containing a strong acid at a temperature of at least 110° C., preferably at least 120° C. Sulfuric acid, hydrochloric acid, and nitric acid are economically preferred as the strong acid to be contained in the treating aqueous solution. In addition to such a strong acid, the treating solution may contain chromic acid, phosphoric acid, various organic acids, and a chelating agent such as ethylenediaminetetraacetic acid. The concentration of the acid in the treating solution should be such that the pH of the solution at ordinary temperature is 1.0 or below, preferably a negative value. Usually, it is sufficient to immerse the membrane in the treating solution and maintain it at a predetermined elevated temperature by heating the solution. Preferably, the solution is stirred occasionally. The treating time at a temperature of 110° C. is at least several hours, and in some cases, scores of days are required. At 120° C., a period of several hours or shorter suffices in almost all cases. At 130° C., the treatment is completed within 1 hour without exception. At a temperature below 110° C., complete regaining of the performance is not observed however long a period of time is spent; or even when the performance is temporarily regained, it is reduced again within a short period of time. Hydrochloric acid or dilute sulfuric acid usually employed for washing off scales cannot attain a temperature of at least 110° C. which is required in the method of this invention, even when it is boiled. To obtain the required temperatures, the following measures are necessary.

(1) The treatment is carried out under elevated pressures.

(2) A non-volatile acid such as sulfuric acid is used in such a concentration that its boiling point becomes 110° C. or higher.

(3) A non-volatile substance such as an inorganic salt or ethylene glycol is dissolved in a dilute aqueous solution of an acid to raise the boiling point of the solution to 110° C. or higher.

A method comparatively easy to practice comprises immersing a membrane to be regenerated in sulfuric acid having a concentration of, for example, 45% by weight (whose boiling point at atmospheric pressure is about 120° C.), gradually heating the sulfuric acid, after a temperature of about 120° C. is reached, maintaining it at this temperature for 1 to 10 hours, withdrawing the membrane, and then washing it with water.

The treatment of membranes by the method of this invention is carried out under severe conditions beyond the conventional knowledge of acid washing, which conditions involve the use of acids having high concentrations and the application of high temperatures. But general perfluorinated membranes are quite stable to such a treatment, and do not undergo damage even though they are repeatedly regenerated. Although the maximum allowable temperature may depend on the type of the membrane to be treated, it has been ascertained that a certain membrane is stable even in 82% by weight sulfuric acid at 170° C. Since the object of this invention can be achieved within one hour at 130° C., it is in practice not necessary to perform the treatment at such a high temperature. To complete the treatment within a reasonable period of time and to eliminate the risk of undesirable effects on the membrane, it is recommended to conduct the treatment at a temperature between 115° C. and 150° C. The present inventors consider the temperature range of 120° to 130° C. to be optimum.

In some cases, treating chemicals may be saved or the treatment can be effected to a further extent by performing the treatment two or more times, and every time renewing the treating solution or changing the type of the treating solution. With some state of membrane contamination, the membrane may evolve a gas during the treatment. If the gas evolution is too abrupt, the gas evolved from the inside of the membrane may irreversibly destroy the structure of the membrane. In such a case, it is necessary to raise the temperature of the treating solution gradually, or to increase the concentration of the treating solution gradually. Furthermore, since contaminating substances on the surface of the membrane and some of the contaminating substances present inside the membrane can be removed at lower temperatures, it is desirable to first wash the membrane under ordinary mild conditions and then apply the method of this invention to the pre-washed membrane.

When the method of this invention is applied to perfluorinated membranes whose current efficiencies have been reduced through use in electrolytic cells or electrodialyzers, they can be regenerated almost completely without exception. The regenerated membranes show almost the same current efficiencies as fresh membranes in electrolysis or electrodialysis. The time which elapses until the regenerated membranes are again reduced in performance is the same as in the case of fresh membranes. For example, when a membrane whose performance has been reduced acceleratingly by using an electrolyte containing much impurities was repeatedly regenerated ten times by the method of this invention, complete reproducibility was observed.

According to the method of this invention, the performances of membranes can be regained completely by performing the treatment at a temperature of at least about 110° C. although this lower limit may differ somewhat from membrane to membrane. Since a chemical change is generally quickened by elevating the temperature, a longer period of time will be necessary if the chemical change is carried out at a lower temperature. As stated hereinabove, however, when the treatment in accordance with this invention is carried out at a temperature lower than 110° C., no complete regaining of the performance of the membranes is observed however long a period of time is spent.

The present inventors have not yet been able to ascertain why the effect of the acid treatment critically differs across the border of 110° C. This, however, seems to have to do with the fact that the polymer constituting the main body of the perfluorinated membrane has a composition close to polytetrafluoroethylene (PTFE). PTFE is said to have a glass transition temperature of 120° to 130° C. The polymers of perfluorinated membranes differ somewhat in composition from PTFE because, for example, the former have ion exchange groups. But the density of the ion exchange groups is generally not so high, and on the other hand, the composition of the other parts of the perfluorinated ion exchange polymers is very similar to that of PTFE. It is therefore assumed that the motion of the molecules of a perfluorinated membrane abruptly becomes active as the temperature exceeds a certain point near 120° C. This means that diffusion of other molecules or ions in the membrane is also markedly facilitated at a temperature above this point. Accordingly, at temperatures higher than this point, the dissolution of contaminating substances and the revival of the structure of the membrane are effected rapidly and completely. It is thought that at temperatures lower than this point by certain degrees, the molecules in the membrane are virtually rendered immobile, and the dissolution of the contaminating substances or the revival of the structure of the membrane is not completely effected and the regaining of its performance is incomplete.

Irrespective of the propriety of the foregoing theoretical analysis, the present invention has a high utilitarian value. Specifically, according to this invention, expensive perfluorinated membranes can be repeatedly used by regeneration, and efforts required to purify the starting salt used in electrolysis can be alleviated.

The following examples illustrate the embodiments and advantages of the present invention specifically. All membranes used in these examples were immersed in a 2% aqueous solution of sodium hydroxide for about 12 hours prior to installation into electrolytic cells.

EXAMPLE 1

Alanine and sodium hydroxide were produced by means of a three-compartment electrolytic cell consisting of an anode, a cathode, and two separating cation permselective diaphragms between the electrodes. A 20% aqueous solution of sodium alaninate was passed through an intermediate compartment isolated from both compartments containing the electrodes by the two diaphragms. A perfluorinated membrane having sulfonic acid groups, Nafion 315 (a tradename for a product of E. I. du Pont de Nemours & Co.), was used as a diaphragm on the cathode side. The current efficiency in the initial stage was 85%. When the operation was continued for 18 months, the current efficiency decreased to about 69%.

Some of the Nafion membrane thus used were treated by various methods conforming to the conditions of the method of this invention. Each of the treated membranes was again installed in the electrolytic cell, and the electrolysis was operated. The current efficiencies achieved with the regenerated membranes were determined. Table 1 summarizes the treatment conditions such as solutions, temperatures, times, and pressures and the current efficiencies obtained in the electrolyses using the treated membranes.

The above electrolysis was carried out at a current density of 17.6 A/dm$^2$ using a 5% aqueous solution of sulfuric acid as an anolyte and a 8% aqueous solution of sodium hydroxide as a catholyte.

TABLE 1

| Run No. | Treatment conditions | | | | Current efficiency after treatment (%) |
|---|---|---|---|---|---|
| | Solution | Temperature (°C.) | Pressure | Time (hours) | |
| 1 | 82% H$_2$SO$_4$ | 170 | atmospheric | 1 | 85 |
| 2 | 45% H$_2$SO$_4$ | 120 | atmospheric | 2 | 85 |
| 3 | 36% HCl | 120 | elevated | 2 | 85 |
| 4 | 40% HNO$_3$ | 120 | elevated | 2 | 85 |
| 5 | 45% H$_2$SO$_4$ | 110 | atmospheric | 100 | 84 |

COMPARATIVE EXAMPLE

The same membranes as treated in Example 1 were treated by methods not conforming to the conditions of this invention. The results are shown in Table 2.

TABLE 2

| Run No. | Treatment conditions | | | | Current efficiency after treatment (%) |
|---|---|---|---|---|---|
| | Solution | Temperature (°C.) | Pressure | Time (hours) | |
| 1 | 82% H$_2$SO$_4$ | 25 | atmospheric | 400 | 75 |
| 2 | 45% H$_2$SO$_4$ | 100 | atmospheric | 500 | 83 → 77 (note 1) |
| 3 | 8% NaOH | 130 | elevated | 2 | 77 |
| 4 | 45% NaOH | 130 | atmospheric | 2 | 73 |
| 5 (note 2) | (1) 1% EDTA (note 3) | 80 | atmospheric | 24 | 73 |
| | (2) 5% HCl | 80 | atmospheric | 24 | |
| | (3) water | 130 | elevated | 2 | |

(Note 1): The current efficiency decreased in several hours.
(Note 2): Treatments with the treating solutions (1), (2) and (3) were carried out successively.
(Note 3): EDTA stands for tetrasodium ethylenediaminetetraacetate.

EXAMPLE 2

In recovering sodium hydroxide by the partial electrolysis of sodium sulfate (Na$_2$SO$_4$) in a two-compartment electrolytic cell, a perfluorinated membrane having sulfonic acid groups, Nafion 425 (a tradename for a product of E. I. du Pont de Nemours & Co.), was used as a diaphragm. Five ppm of a calcium ion was included in the starting aqueous solution of sodium sulfate. The current efficiency was about 84% in the initial stage, but in one week, decreased to 73%. The Nafion membrane was immersed in a 45% aqueous solution of sulfuric acid and regenerated at 120° C. for 2 hours, and again used in the electrolysis. The current efficiency was 84% which again decreased to 75% in one week. In this way, the regeneration and use were repeated ten times. Immediately after every regeneration, the current efficiency was 84 to 85%, but in one week from then, it decreased to 73 to 77%.

The electrolysis was carried out at a current density of 20 A/dm$^2$ using a 15% aqueous solution of sodium sulfate as an anolyte and a 15% aqueous solution of sodium hydroxide as a catholyte.

EXAMPLE 3

In the production of sodium hydroxide by electrolyzing brine in a two-compartment electrolytic cell, a perfluorocarbon membrane having both sulfonic acid and carboxyl groups, Nafion 901 (a tradename for a product of E. I. du Pont de Nemours & Co.), was used as a diaphragm. The starting brine contained 0.2 ppm of a calcium ion and 0.05 ppm of a magnesium ion. The current efficiency which was 92% in the initial stage decreased to 80% in two weeks. The Nafion membrane was immersed in a 45% aqueous solution of sulfuric acid, and the solution was gradually heated to 120° C. and maintained at this temperature for 2 hours to regenerate the membrane. The treated membrane was again used in the electrolysis. The current efficiency was 92%.

The electrolysis was carried out at a current density of 20 A/dm$^2$ using a brine containing 30% of sodium chloride as an anolyte and a 15% aqueous solution of sodium hydroxide as a catholyte.

EXAMPLE 4

In the electrolysis of sodium alaninate by the same method as in Example 1, a perfluorinated membrane having both sulfonic acid and sulfonamide groups, Nafion 215 (a tradename for a product of E. I. du Pont de Nemours & Co.), was used as a diaphragm on the cathode side. The current efficiency in the initial stage was 87%, but decreased to 75% in one month. The membrane was removed and immersed in a 45% aqueous solution of sulfuric acid. The sulfuric acid solution was gradually heated, and when the temperature reached 120° C., the solution and the membrane was maintained at this temperature for 2 hours. When the treated membrane was again used in the electrolysis, the current efficiency was 86%.

What is claimed is:

1. A method for regenerating a perfluorinated cation exchange polymer membrane which can give only a low current efficiency as a result of being used as a diaphragm in an electrolytic cell or an electrodialyzer, said method comprising maintaining said perfluorinated cation exchange polymer membrane at a temperature of at least 110° C. while keeping it in contact with an aqueous solution of a strong acid having a pH at ordinary temperature of not more than 1.0 and wherein the current efficiency is increased to at least about 84%.

2. The method of claim 1 wherein the aqueous solution containing a strong acid has a negative pH value at ordinary temperature.

3. The method of claim 1 wherein the strong acid is sulfuric acid, hydrochloric acid or nitric acid.

4. The method of claim 1 wherein the strong acid-containing aqueous solution further contains chromic acid, phosphoric acid, an organic acid or a chelating agent.

5. The method of claim 1 wherein the temperature is 110° to 170° C.

6. The method of claim 1 wherein the temperature is 115° to 150° C.

7. The method of claim 1 wherein the temperature is 120° to 130° C.

* * * * *